US011102833B2

(12) United States Patent
Kim

(10) Patent No.: US 11,102,833 B2
(45) Date of Patent: Aug. 24, 2021

(54) APPARATUS FOR SWITCHING COMMUNICATION MODE AND METHOD THEREOF

(71) Applicant: LG Electronics Inc., Seoul (KR)

(72) Inventor: Nam Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 16/552,348

(22) Filed: Aug. 27, 2019

(65) Prior Publication Data

US 2019/0387564 A1 Dec. 19, 2019

(30) Foreign Application Priority Data

Jun. 25, 2019 (KR) ........................ 10-2019-0075721

(51) Int. Cl.
*H04W 4/40* (2018.01)
*H04W 76/15* (2018.01)
*G05D 1/00* (2006.01)
*H04W 24/04* (2009.01)
*H04W 64/00* (2009.01)

(52) U.S. Cl.
CPC .......... *H04W 76/15* (2018.02); *G05D 1/0022* (2013.01); *H04W 4/40* (2018.02); *H04W 24/04* (2013.01); *H04W 64/003* (2013.01)

(58) Field of Classification Search
CPC ...... G05D 1/0022; H04W 24/04; H04W 4/40; H04W 64/003; H04W 76/14; H04W 76/15; H04W 76/19
See application file for complete search history.

(56) References Cited

U.S. PATENT DOCUMENTS

| 10,755,580 | B2* | 8/2020 | McQuillen | ............... H04W 4/46 |
| 2018/0132307 | A1* | 5/2018 | Almeida Neves | .... H04L 65/102 |
| 2018/0295628 | A1* | 10/2018 | Lu | ..................... H04W 72/1205 |
| 2019/0182700 | A1* | 6/2019 | Kim | ....................... H04W 28/02 |
| 2020/0178198 | A1* | 6/2020 | Ding | ....................... G07C 5/008 |
| 2020/0296187 | A1* | 9/2020 | Sabella | .................. H04L 69/08 |

FOREIGN PATENT DOCUMENTS

KR 101626494 6/2016

* cited by examiner

*Primary Examiner* — Phuc H Tran
(74) *Attorney, Agent, or Firm* — Fish & Richardson P.C.

(57) ABSTRACT

A communication mode switching apparatus installed in a vehicle is connected to a user terminal and a server system for providing a vehicle sharing service. The apparatus is configured to perform operations including: supporting communication based on communication modes and communicating with the server system, determining, according to a communication state between a communication unit and the server system, whether the server system or a mobile communication network has failed, selecting at least one communication mode in response to the determined result, and operating the communication unit in the selected communication mode. The communication modes include a first communication mode for communicating with the user terminal via a vehicle to pedestrian (V2P) protocol and a second communication mode for communicating with the server system via the mobile communication network. The apparatus calculates a position where the V2P communication with the user terminal is possible in the first communication mode.

16 Claims, 7 Drawing Sheets

APPARATUS FOR SWITCHING COMMUNICATION MODE AND METHOD THEREOF

CROSS-REFERENCE TO RELATED APPLICATION

This present application claims benefit of priority to Korean Patent Application No. 10-2019-0075721, entitled "APPARATUS FOR SWITCHING COMMUNICATION MODE AND METHOD THEREOF" and filed on Jun. 25, 2019, in the Korean Intellectual Property Office, the entire disclosure of which is incorporated herein by reference.

BACKGROUND

1. Field of the Invention

The present disclosure relates to a communication mode switching apparatus and method, in which a communication state between a vehicle and a user is confirmed or predicted, and according to the confirmed or predicted communication state, a communication mode among a plurality of communication modes switches to a communication mode wherein a connection is available between the vehicle and the user.

2. Description of the Related Art

Car or ride sharing refers to a service by which multiple users share one or more vehicles wherein each user can occupy and use a vehicle only when the vehicle is needed and vacate the vehicle when the vehicle is no longer needed, thereby saving vehicle purchase cost, vehicle operation cost, and vehicle maintenance cost.

One method for efficiently sharing vehicles is disclosed in Korean Patent Registration No. 10-1626494, wherein an in-vehicle vehicle sharing integrated terminal and a vehicle sharing control server are connected to each other through a mutual mobile communication network. Specifically, in the method disclosed in Korean Patent Registration No. 10-1626494, the vehicle sharing integrated terminal may provide vehicle driving information in real-time by inter-linking with a Global Positioning System (GPS) when a vehicle is driving, provide, to the vehicle sharing control server, wirelessly via the mobile communication network, monitoring information on the battery voltage of the vehicle and on whether the battery is unplugged by any unauthorized use, and state information, position information, and usage history information dependent on the driving of the vehicle, and integrally control the vehicle. In addition, the vehicle sharing control server may, in response to a user request through the Internet or mobile communications to use the vehicle sharing service, receive vehicle request and reservation information and search for and provide vehicle information and position information on available vehicles, confirm whether vehicles are reserved by users, register reservation information for reserved vehicles in a database, and wirelessly transmit reservation information to vehicle sharing integrated terminals installed in vehicles. Also, the vehicle sharing control server may receive usage history information of the vehicles transmitted from the vehicle sharing integrated terminals, calculating service usage fees based on the usage history information and initial reservation information, and bill the calculated fees through the RF cards of the users at a later date or immediately.

According to the conventional vehicle sharing method as described above, when the vehicle sharing control server, which is a main server, has malfunctioned or the mobile communication network has failed, the vehicle sharing service is not available until the server or the mobile communication network is restored, since information of the available vehicle such as the position information cannot be provided to the user terminal.

For this reason, an issue exists wherein a user may not necessarily use the vehicle sharing service at all times.

Therefore, there is a need for a technology that can provide vehicle information even when the vehicle sharing service server has malfunctioned or the mobile communication network has failed after the vehicle has been allocated to the user using the vehicle sharing service.

Related Art: Korean Patent Registration No. 10-2019-0042919.

SUMMARY

An aspect of the present disclosure provides a communication mode switching apparatus and method, in which a structure configured to provide communication only through a server based on a mobile communication network between a user of a vehicle sharing service and a vehicle, which caused the above-described issues, is improved, such that mutual information between the vehicle sharing service user and the vehicle can be transmitted and received even when the vehicle sharing service server has malfunctioned or the mobile communication network has failed after the vehicle has been allocated.

Another aspect of the present disclosure provides a communication mode switching apparatus and method, in which a mutual communication connection can be ensured under various circumstances by calculating a position where the connection between the vehicle and the user terminal is ensured when direct communication is established between the vehicle and the user terminal, even when the vehicle sharing service server has malfunctioned or the mobile communication network has failed.

It is be understood that the present disclosure is not limited to the above-mentioned aspects, and other aspects and advantages of the present disclosure not mentioned above will become apparent from the following description, and will be more clearly understood by the embodiments of the present disclosure. It is also to be understood that the aspects and advantages of the present disclosure may be realized by means and combinations thereof set forth in the claims.

A communication mode switching apparatus according to an embodiment of the present disclosure may include a communication mode for providing communication between a user terminal and a vehicle device even when a server system or a mobile communication network has failed, in addition to a communication mode for providing communication between the user terminal and the vehicle device through the server system configured to provide the vehicle sharing service based on the mobile communication network, thereby ensuring continuity and accuracy of communication between the user terminal and the vehicle device when using the vehicle sharing service.

More specifically, the communication mode switching apparatus according to this embodiment of the present disclosure may be a communication mode switching apparatus installed in a vehicle and connected to a user terminal and a server system configured to provide a vehicle sharing service, so that signals are transmitted and received, and may include a communication unit configured to support communication by means of a plurality of communication modes and communicate with the server system, and a control unit configured to determine whether the server system or a mobile communication network has failed according to a communication state between the communication unit and the server system, select at least one communication mode among the plurality of communication modes in response to the determined result, and cause the communication unit to operate in the selected communication mode, wherein the plurality of communication modes may include a first communication mode for communicating with the user terminal via a Vehicle to Pedestrian (V2P) protocol and a second communication mode for communicating with the server system via the mobile communication network, and the control unit may calculate a position where the V2P communication with the user terminal is possible when the communication unit is in the first communication mode.

In addition, the control unit may be configured to periodically determine whether the server system or the mobile communication network has failed, cause the vehicle to move to the position where the V2P communication with the user terminal is possible and cause the communication unit to operate in the first communication mode, when it is determined that the server system or the mobile communication network has failed, and cause the communication unit to operate in the first communication mode or the second communication mode when the server system or the mobile communication network has not failed.

In addition, the communication unit may include a wireless communication unit configured to support the second communication mode and transmit and receive signals via the mobile communication network, and a V2P communication unit configured to support the first communication mode and transmit and receive signals through one of a PC5 interface and an LTE-Uu interface.

In addition, the communication unit may further include an ITS communication unit connected to an Intelligent Transport System (ITS) server configured to provide road traffic information so that signals are transmitted and received via one of a Vehicle to Infrastructure (V2I) protocol and a Vehicle to Network (V2N) protocol, and the control unit may receive, from the ITS server through the ITS communication unit, attribute information including a position of an a RoadSide Unit (RSU) adjacent to the user terminal, and calculate a position where the V2P communication with the user terminal is possible based on the received attribute information.

In addition, the control unit may cause the user terminal to transmit a signal requesting an initiation of the V2P communication through the communication unit when the user terminal is arranged at the position where the V2P communication is possible.

In addition, the control unit may receive position information of the user terminal through the communication unit and determine, based on position information of the vehicle on which the communication unit is mounted and the position information of the user terminal, a location and time at which a user carrying the user terminal is capable of boarding, when transmitting and receiving signals to and from the user terminal in the first communication mode through the communication unit.

In addition, the communication unit may communicate with a local disk of a telematics control unit connected to the server system, and the control unit may generate billing information based on the position information of a vehicle device on which the communication unit is mounted, and transmit the generated billing information to the local disk, when transmitting and receiving signals to and from the user terminal in the first communication mode through the communication unit.

A communication mode switching apparatus according to another embodiment of the present disclosure may be a communication mode switching apparatus connected to a vehicle device and a server system providing a vehicle sharing service, so that signals are transmitted and received, and may include a user interface unit configured to output one of video and audio, a communication unit configured to support communication by means of a plurality of communication modes and communicate with the server system, and a control unit determining whether the server system or a mobile communication network has failed according to a communication state of the communication unit with the server system—selecting at least one communication mode among a plurality of communication modes in response to the determined result, and causing the communication unit to operate in the selected communication mode, wherein the plurality of communication modes may include a first communication mode for communicating with the vehicle device via a Vehicle to Pedestrian (V2P) protocol, and a second communication mode for communicating with the server system via the mobile communication network, and the control unit may calculate a position where the V2P communication with the vehicle device is possible and cause the calculated position to be displayed through the user interface unit, when the communication unit is in the first communication mode.

In addition, the communication unit may include a wireless communication unit configured to support the second communication mode and transmit and receive signals via the mobile communication network, and a V2P communication unit configured to support the first communication mode and transmit and receive signals through any one of a PC5 interface and an LTE-Uu interface.

In addition, the communication unit may further include an ITS communication unit connected to an Intelligent Transport System (ITS) server configured to provide road traffic information, so that signals are transmitted and received via a Pedestrian to Network (P2N) protocol, and a P2I communication unit connected to an RoadSide Unit (RSU) connected to the ITS server 5000, so that signals are transmitted and received via a Pedestrian to Infrastructure (P2I), and the control unit may receive attribute information including a position of the RoadSide Unit (RSU) adjacent to the vehicle device from the ITS server through the ITS communication unit, and calculate a position where the V2P communication with the vehicle device is possible based on the received attribute information.

In addition, the control unit may cause the communication unit to operate in the first communication mode when receiving, from the vehicle device through the communication unit, a signal requesting initiation of the V2P communication.

In addition, the communication unit may communicate with a local disk of a telematics control unit connected to the server system, and the control unit may generate billing information based on the position information of a user terminal on which the communication unit is mounted, and transmit the generated billing information to the local disk, when transmitting and receiving signals to and from the vehicle device in the first communication mode through the communication unit.

A method for switching a communication mode according to still another embodiment of the present disclosure may be a method for switching a communication mode of a vehicle device communicating with a server system in a vehicle sharing service, and may include communicating with the server system, determining whether the server system or a mobile communication network has failed according to a communication state with the server system, and selecting at least one communication mode among a plurality of communication modes including a first communication mode for communicating with the user terminal via a Vehicle to Pedestrian (V2P) protocol and a second communication mode for communicating with the server system via the mobile communication network in response to the determined result, calculating a position where the V2P communication with the user terminal is possible when the first communication mode is selected, and causing the vehicle to be moved to a position where the V2P communication with the user terminal is possible.

A method for switching a communication mode according to yet another embodiment of the present disclosure may be a method for switching a communication mode of a user terminal communicating with a server system and a vehicle device in a vehicle sharing service, and may include communicating with the server system, determining whether the server system or a mobile communication network has failed according to a communication state with the server system, and selecting at least one communication mode among a plurality of communication modes including a first communication mode for communicating with the vehicle device via a Vehicle to Pedestrian (V2P) protocol and a second communication mode for communicating with the server system via the mobile communication network in response to the determined result, calculating a position where the V2P communication with the user terminal is possible when the first communication mode is selected, and causing the position where the V2P communication with the vehicle device is possible to be displayed.

A non-transitory computer-readable recording medium according to yet another embodiment of the present disclosure may be a non-transitory computer-readable recording medium on which a program for switching a communication mode of a vehicle device communicating with a server system in a vehicle sharing service is recorded, the program causing a computer to perform: communicating with the server system, determining whether the server system or a mobile communication network has failed according to a communication state with the server system, and selecting at least one communication mode among a plurality of communication modes including a first communication mode for communicating with the user terminal via a Vehicle to Pedestrian (V2P) protocol and a second communication mode for communicating with the server system via the mobile communication network in response to the determined result, calculating a position where the V2P communication with the user terminal is possible when the first communication mode is selected, and causing the vehicle to be moved to a position where the V2P communication with the user terminal is possible.

A non-transitory computer-readable recording medium according to yet another embodiment of the present disclosure may be a non-transitory computer-readable recording medium on which a program for switching a communication mode of a user terminal communicating with a server system and a vehicle device in a vehicle sharing service is recorded, the program causing a computer to perform: communicating with the server system, determining whether the server system or a mobile communication network has failed according to a communication state with the server system, and selecting at least one communication mode among a plurality of communication modes including a first communication mode for communicating with the vehicle device via a Vehicle to Pedestrian (V2P) protocol and a second communication mode for communicating with the server system via the mobile communication network in response to the determined result, calculating a position where the V2P communication with the user terminal is possible when the first communication mode is selected, and causing a position where the V2P communication with the vehicle device is possible to be displayed.

The details of other embodiments may be included in the detailed description and drawings. Other aspects, features, and advantages than those described above will become apparent from the following drawings, claims, and detailed description of the present disclosure.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

The above and other objects, features, and advantages of the present disclosure will become apparent from the following description of preferred embodiments given in conjunction with the accompanying drawings, in which.

DETAILED DESCRIPTION OF THE EMBODIMENTS

Figure 1:
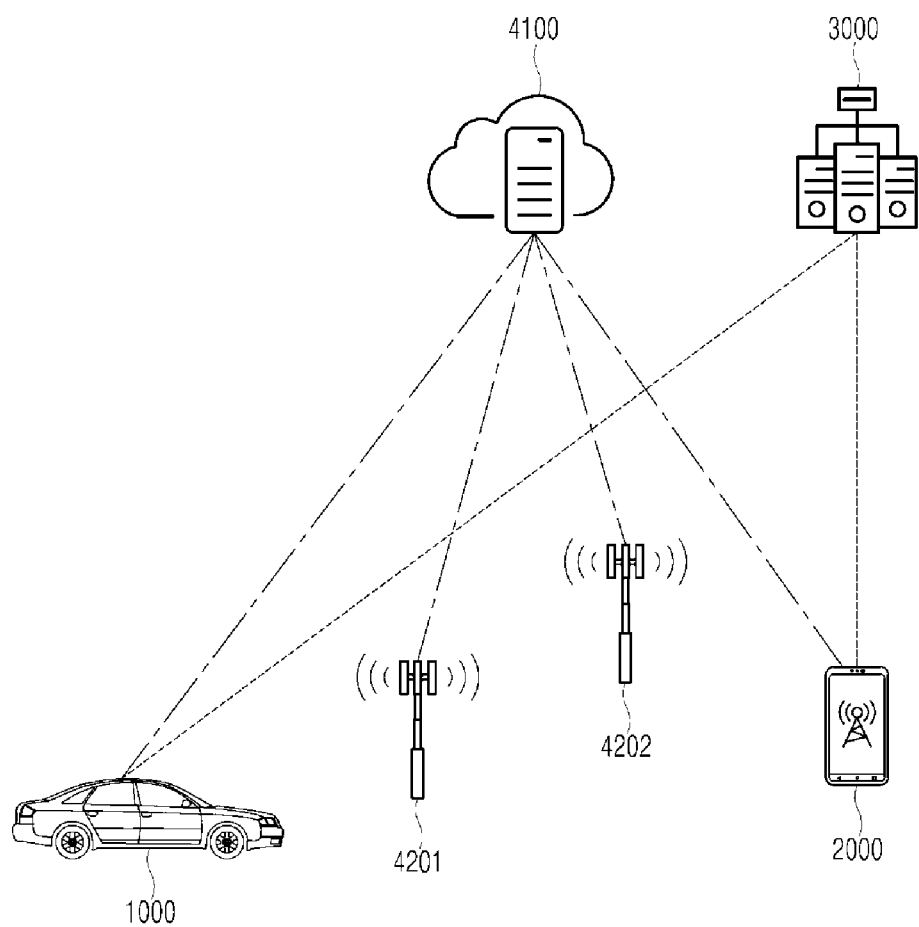
FIG. 1 is a diagram illustrating a vehicle sharing service system to which a communication mode switching apparatus according to an embodiment of the present disclosure is applied.

The embodiments disclosed in the present specification will be described in greater detail with reference to the accompanying drawings, and throughout the accompanying drawings, the same reference numerals are used to designate the same or similar components and redundant descriptions thereof are omitted. In the following description, the suffixes "module" and "unit" that are mentioned with respect to the elements used in the present description are merely used individually or in combination for the purpose of simplifying the description of the present invention, and therefore, the suffix itself will not be used to differentiate the significance or function or the corresponding term. Further, in the description of the embodiments of the present disclosure, when it is determined that the detailed description of the related art would obscure the gist of the present disclosure, the description thereof will be omitted. Also, the accompanying drawings are provided only to facilitate understanding of the embodiments disclosed in the present disclosure and therefore should not be construed as being limiting in any way. It should be understood that all modifications, equivalents, and replacements which are not exemplified herein but are still within the spirit and scope of the present disclosure are to be construed as being included in the present disclosure.

The terms such as "first", "second", and other numerical terms may be used herein only to describe various elements and only to distinguish one element from another element, and as such, these elements should not be limited by these terms.

Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

As used herein, the singular forms "a", "an", and "the" are intended to include the plural forms as well, unless the context clearly indicates otherwise.

It will be understood that in the present application, the terms such as "includes", "comprises", or "having" are used to specify the presence of a feature, a number, a step, an operation, an element, a component, a part, or a combination thereof in the specification, but do not preclude in advance the possibility of the presence or addition of one or more other features, numbers, steps, operations, elements, components, parts, or combinations thereof.

The vehicle described herein may be a concept including a car and a motorcycle. Hereinafter, the vehicle will be described mainly with respect to the car.

The vehicle described herein may be a concept including an internal combustion engine vehicle having an engine as a power source, a hybrid vehicle having an engine and an electric motor as a power source, and an electric vehicle having an electric motor as a power source.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The advantages and features of the present disclosure, and the method for achieving them, will be apparent with reference to the embodiments described in detail in conjunction with the accompanying drawings. However, it should be understood that the present disclosure is not limited to the embodiments set forth herein, but may be embodied in many different forms and includes all conversions, equivalents, and alternatives falling within the spirit and scope of the present disclosure.

Figure 4:
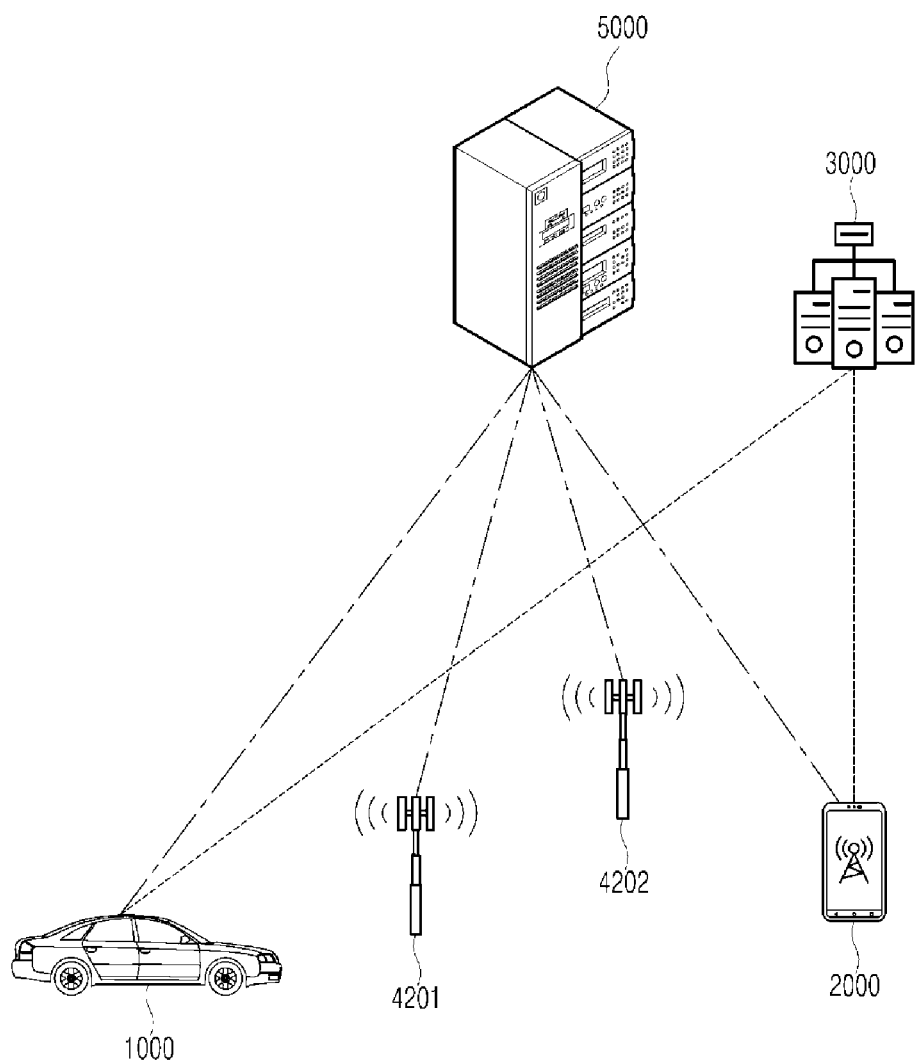
FIG. 4 is a diagram illustrating a vehicle sharing service system to which a communication mode switching apparatus according to an embodiment of the present disclosure is applied.
Figure 5:
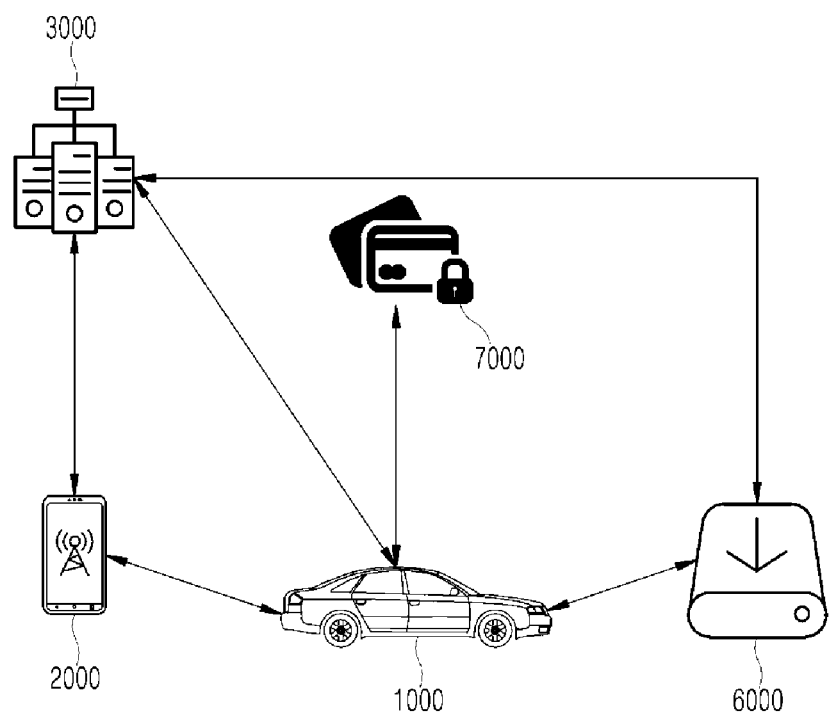
FIG. 5 is a diagram illustrating a vehicle sharing service system to which a communication mode switching apparatus according to an embodiment of the present disclosure is applied.

FIGS. 1, 4, and 5 are diagrams illustrating a vehicle sharing service system to which a communication mode switching apparatus according to an embodiment of the present disclosure is applied.

Figure 2:
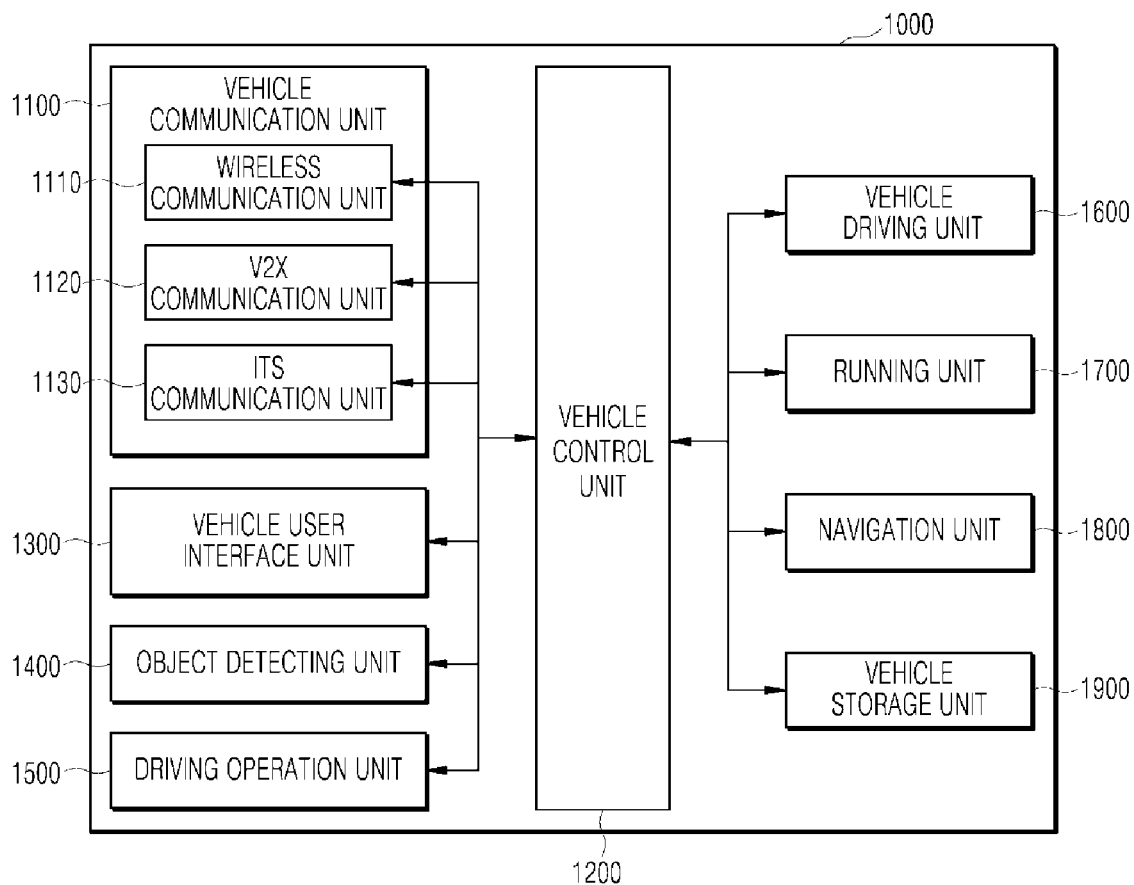
FIG. 2 is a block diagram illustrating a communication mode switching apparatus installed on a vehicle side according to an embodiment of the present disclosure.

FIG. 2 is a block diagram illustrating a communication mode switching apparatus installed on a vehicle side according to an embodiment of the present disclosure.

Figure 3:
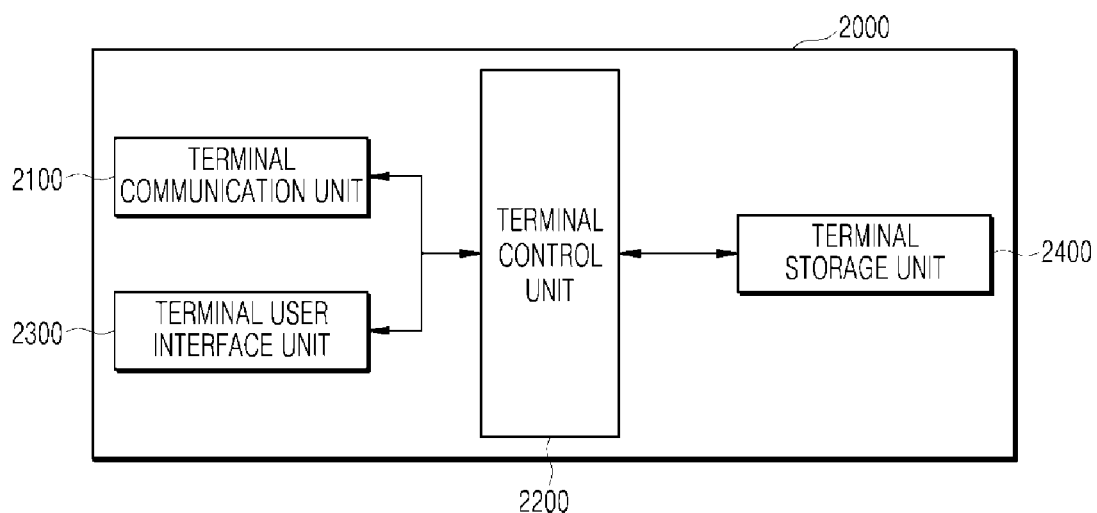
FIG. 3 is a block diagram illustrating a communication mode switching apparatus installed on a user terminal side according to an embodiment of the present disclosure.

FIG. 3 is a block diagram illustrating a communication mode switching apparatus installed on a user terminal side according to an embodiment of the present disclosure.

Referring to FIGS. 1 to 3, the vehicle sharing service system may include a vehicle 1000, a user terminal 2000, a server system 3000, a Vehicle to Network (V2N) server, and a plurality of Road Side Units (RSUs) 4201 and 4202.

As shown in FIG. 2, the communication mode switching apparatus may be mounted on a vehicle 1000 having a wheel rotated by a power source and a steering input device for adjusting a driving direction. Here, the vehicle 1000 may be an autonomous driving vehicle, and may be switched from an autonomous driving mode to a manual mode or from the autonomous driving mode to the manual mode according to a user input received through the vehicle user interface unit 1300.

In addition, the vehicle 1000 can be switched from the autonomous driving mode to the manual mode or from the manual mode to the autonomous driving mode according to a driving situation. Here, the driving situation may be determined by at least one of the information received by a vehicle communication unit 1100, the external object information detected by an object detecting unit 1400, and the navigation information acquired by a navigation unit 1800.

When the vehicle 1000 is driven in the autonomous driving mode, the vehicle 1000 can be driven under the control of a running unit 1700 which controls driving, unparking, and parking operations. Meanwhile, when the vehicle 1000 is driven in the manual mode, the vehicle 1000 can be driven by an input through a driving operation unit 1500 of the driver.

As shown in FIG. 2, the communication mode switching apparatus installed on the vehicle 1000 side may include a vehicle communication unit 1100, a vehicle control unit 1200, a vehicle user interface unit 1300, an object detecting unit 1400, a driving operation unit 1500, a vehicle driving unit 1600, a running unit 1700, a navigation unit 1800, and a vehicle storage unit 1900.

In this embodiment, the communication mode switching apparatus may include components other than those shown in FIG. 2 and described below, or may not include some of the components shown in FIG. 2 and described below.

The vehicle communication unit 1100 may support communication by means of a plurality of communication modes, receive a signal from the server system 3000, and transmit a signal to the server system 3000. In addition, the vehicle communication unit 1100 may receive a signal from the user terminal 2000 and transmit a signal to the user terminal 2000. Here, the plurality of communication modes may include a first communication mode for communicating with the user terminal 2000 via a Vehicle to Pedestrian (V2P) protocol, and a second communication mode for communicating with the server system 3000 via a mobile communication network.

The vehicle communication unit 1100 may include a wireless communication unit 1110, a V2X communication unit 1120, and an ITS communication unit 1130.

In this embodiment, the vehicle communication unit 1100 may include components other than those shown in FIG. 2 and described below, or may not include some of the components shown in FIG. 2 and described below. For example, the vehicle communication unit 1100 may include a position information unit that is not shown in FIG. 2, but receives a signal including position information of the vehicle 1000. The position information unit may include a Global Positioning System (GPS) module or a Differential Global Positioning System (DGPS) module.

The wireless communication unit 1110 may transmit and receive signals between the user terminal 2000 and the server system 3000 via a mobile communication network. Here, the mobile communication network may be a multiple access system capable of supporting multi-user communication by sharing system resources (such as bandwidth and transmission power). The multiple access system may be, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

The wireless communication unit 1110 may transmit specific information to the 5G network when the vehicle 1000 is driven in an autonomous driving mode.

In this case, the specific information may include autonomous driving-related information.

The autonomous driving-related information may be information directly related to the control of vehicle driving. For example, the autonomous driving-related information may include at least one of object data indicating an object around the vehicle, map data, vehicle state data, vehicle position data, and driving plan data.

The autonomous driving-related information may further include service information necessary for autonomous driving For example, the specific information may include information about a safety rating of the vehicle and a destination which is input through the user terminal 2000.

In addition, the 5G network may determine whether the vehicle is remotely controlled.

Here, the 5G network may include a server or module which performs remote control associated with the autonomous driving.

In addition, the 5G network may transmit information (or signals) associated with the remote control to the autonomous driving vehicle.

As described above, the information associated with the remote control may be signals directly applied to the autonomous driving vehicle, and may further include service information required for the autonomous driving. In an embodiment of the present disclosure, the autonomous driving vehicle may provide services associated with the autonomous driving by receiving service information such as information associated with a safe or dangerous section for each section selected on a driving path, through the server connected to the 5G network.

The V2X communication unit 1120 may transmit and receive signals to and from the Road Side Unit (RSU) (V2I: Vehicle to Infrastructure), another vehicle, or the user terminal 2000 (V2P: Vehicle to Pedestrian) in a wireless manner. The V2X communication unit 1120 may include an RF circuitry in which a Vehicle to Infrastructure (V2I), a Vehicle to Vehicle (V2V), and communication with a user terminal 2000 (V2P) protocols can be implemented.

The V2X communication unit 1120 may perform a function of the V2P communication unit which transmits and receives signals through one of a PC5 interface and an LTE-Uu interface. That is, the V2X communication unit 1120 may transmit and receive signals to and from the user terminal 2000 which has established a one-to-one (Direct) connection by means of a Public Key Infrastructure (PM) authentication through the PC5 interface. The detailed procedures of the authentication and the connection can be found in the disclosure in section 5.4.5.2 of 3GPP TS 23.303 (Establishment of secure layer-2 link over PC5). In addition, after the public key authentication, the V2X communication unit 1120 may transmit and receive signals to and from the user terminal 2000 indirectly connected via an evolved Node B (eNB) through the LTE-Uu interface. The details of the connection procedure can be referred to in the disclosure in the Selected IP Traffic Offload at Local Network (SIPTO@LN) presented in 3GPP TS 23.401.

The Intelligent Transport System (ITS) communication unit 1130 may be connected to an Intelligent Transport System (ITS) server 5000 that provides road traffic information so that signals are transmitted and received via one of the Vehicle to Infrastructure (V2I) protocol and the Vehicle to Network (V2N) protocol. The ITS communication unit 1130 may provide information and data acquired in a traffic system. In addition, the ITS communication unit 1130 may receive a control signal from the traffic system to provide the control signal to the vehicle control unit 1200.

The vehicle control unit 1200 may determine whether the server system 3000 or the mobile communication network has failed by determining a communication state with the server system 3000 based on whether a server signal is received through the vehicle communication unit 1100 or on the quality of the received server signal, select one communication mode among the plurality of communication modes in response to the determined result, and cause the vehicle communication unit 1100 to operate in the selected communication mode. The vehicle control unit 1200 may switch from a second communication mode to a first communication mode when there is an issue in transmitting and receiving signals to and from the server system 3000 for more than a few seconds, based on whether the server signal is received through the vehicle communication unit 1100 or on the quality of the received server signal. That is, the vehicle control unit 1200 may periodically determine whether the server system 3000 or the mobile communication network has failed, and when it is determined that the server system 3000 or the mobile communication network has failed, cause the vehicle communication unit 1100 to operate in the first communication mode.

When a signal to select the first communication mode is inputted through the vehicle user interface unit 1300, the vehicle control unit 1200 may control a communication mode of the vehicle communication unit 1100 to be switched from the second communication mode to the first communication mode, regardless of whether the server system 3000 or the mobile communication network has failed. Accordingly, a vehicle user can use the first communication mode in which direct communication with the user terminal 2000 is supported, instead of the second communication mode supported by a billing mobile communication network (such as LTE and 5G).

The vehicle control unit 1200 may determine whether a connection through an external infrastructure of the LTE-Uu interface is impossible while the vehicle communication unit 1100 is operating in the first communication mode, based on whether the server signal is received through the vehicle communication unit 1100 or on the quality of the received server signal. In this case, when the connection through the external infrastructure is impossible, the vehicle control unit 1200 may switch the communication interface of the vehicle communication unit 1100 from the LTE-Uu interface to the PC5 interface, so that the vehicle sharing service can be continued.

The vehicle control unit 1200 may receive, from the ITS server 5000 through the ITS communication unit 1130, attribute information including a position of the RSU 4202 adjacent to the user terminal 2000 and calculate a position where the V2P communication with the user terminal 2000 is possible based on the received attribute information.

When the vehicle communication unit 1100 is communicating in the first communication mode, the vehicle control unit 1200 may cause the vehicle 1000 to move to a position where the vehicle 1000 can communicate with the user terminal 2000, by referring to the calculated position where the V2P communication with the user terminal 2000 is possible as described above.

When the user terminal 2000 is arranged at the position where the V2P communication is possible, the vehicle control unit 1200 may cause the vehicle communication unit 1100 to transmit a signal requesting an initiation of the V2P communication to the user terminal 2000. The vehicle control unit 1200 may receive in advance, from the vehicle communication unit 1100, the vehicle user interface unit 1300, or the vehicle storage unit 1900, information on the maximum length of the V2P communication supported by the user terminal 2000, and cause, based on the received information, the vehicle communication unit 1100 to transmit the signal requesting the initiation of the V2P communication to the user terminal 2000 when a distance between an expected arrival location of the vehicle 1000 and the vehicle 1000 is less than or equal to a distance at which the V2P communication with the user terminal is possible.

The vehicle control unit 1200 may receive position information of the user terminal 2000 through the vehicle communication unit 1100 and determine, based on the position information of the vehicle 1000 on which the vehicle communication unit 1100 is mounted and the position information of the user terminal 2000, a location and time at which a user carrying the user terminal 2000 is capable of boarding, when transmitting and receiving signals to and from the user terminal 2000 in the first communication mode through the vehicle communication unit 1100.

The vehicle control unit 1200 may cause the vehicle 1000 to bypass another vehicle by means of the running unit 1700 when receiving a safety message from the another vehicle, for example, a vehicle for which an accident has occurred while driving ahead, through the V2X communication unit 1120 of the vehicle communication unit 1100.

The vehicle control unit 1200 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), Processors, Controllers, Micro-controllers, Microprocessors, and electrical units for performing other functions.

The vehicle user interface unit 1300 is for communication between the vehicle 1000 and the vehicle user. The vehicle user interface unit 1300 may receive a user input signal, transmit the received input signal to the vehicle control unit 1200, and provide, to the user, information held by the vehicle 1000 by means of the vehicle control unit 1200. The vehicle user interface unit 1300 may include, but is not limited to, an input unit, an internal camera, a bio-sensing unit, and an output unit.

The object detecting unit 1400 is for detecting an object located outside the vehicle 1000. The object detecting unit 1400 may generate object information based on the sensing data and transmit the generated object information to the vehicle control unit 1200. In this case, the object may include various objects related to the driving of the vehicle 1000 such as lanes, other vehicles, pedestrians, two-wheelers, traffic signals, lights, roads, structures, speed bumps, terrains, and animals.

The driving operation unit 1500 may receive inputs for driving the vehicle 1000 in a manual mode and may include, but is not limited to, a steering input unit, an acceleration input unit, and a brake input unit.

The vehicle driving unit 1600 may electrically control the driving of various devices in the vehicle 1000 and may include, but is not limited to, a power train driving unit, a chassis driving unit, a door/window driving unit, a safety driving unit, a lamp driving unit, and an air conditioning driving unit.

The running unit 1700 may control various operations of the vehicle 1000 in an autonomous driving mode and may include, but is not limited to, a driving unit, an unparking unit, and a parking unit.

The navigation unit 1800 may provide navigation information to the vehicle control unit 1200. The navigation information may include at least one of map information, set destination information, route information based on destination setting, information about various objects on the route, lane information, and current position information of the vehicle.

The navigation unit 1800 may include a memory. The memory may store the navigation information. The navigation information may be updated by information received through the vehicle communication unit 1100. The navigation unit 1800 may be controlled by a built-in processor or may operate by receiving an external signal, for example, a control signal from the vehicle control unit 1200, but is not limited thereto.

The vehicle storage unit 1900 may be electrically connected to the vehicle control unit 1200. The vehicle storage unit 1900 may store basic data for each part of the communication mode switching apparatus, control data for controlling operations of each part of the communication mode switching apparatus, and input/output data. The vehicle storage unit 1900 may be, in hardware, various storage devices such as a ROM, a RAM, an EPROM, a flash drive, and a hard drive. The vehicle storage unit 1900 may store various data for entire operations of the vehicle 1000, such as a program for processing or controlling the vehicle control unit 1200. In this case, the vehicle storage unit 1900 may be formed integrally with the vehicle control unit 1200 or may be implemented as a sub-component of the vehicle control unit 1200.

As shown in FIG. 3, the communication mode switching apparatus may be installed in a user terminal 2000 owned by a customer using a vehicle sharing service. The user terminal 2000 may be a portable device such as a notebook computer, a mobile phone, a Personal Digital Assistant (PDA), a smart phone, or a multimedia device, or may be a non-portable device such as a Personal Computer (PC) or a vehicle mounted device.

As shown in FIG. 3, the communication mode switching apparatus installed on the user terminal 2000 side may include a terminal communication unit 2100, a terminal control unit 2200, a terminal user interface unit 2300, and a terminal storage unit 2400.

In this embodiment, the communication mode switching apparatus may include components other than those shown in FIG. 3 and described below, or may not include some of the components shown in FIG. 3 and described below.

The terminal communication unit 2100 may support communication by the plurality of communication modes, receive server signals from the server system 3000, and transmit signals to the server system 3000. In addition, the terminal communication unit 2100 may receive signals from the vehicle 1000 and transmit signals to the vehicle 1000. Here, the plurality of communication modes may include a first communication mode for communicating with the vehicle 1000 via the V2P protocol and a second communication mode for communicating with the server system 3000 via the mobile communication network.

The terminal communication unit 2100 may include a wireless communication unit, a Pedestrian to Everything (P2X) communication unit, and an ITS communication unit.

In this embodiment, the terminal communication unit 2100 may include components other than those described below, or may not include some of the components described below. For example, the terminal communication unit 2100 may include a position information unit, not shown in FIG. 3, for receiving signals including the position information of the user terminal 2000. The position information unit may include a GPS module or DGPS module.

The wireless communication unit may transmit and receive signals to and from the vehicle 1000 or the server system 3000 via the mobile communication network. Here, the mobile communication network may be a multiple access system capable of supporting multi-user communication by sharing the system resources (such as bandwidth and transmission power). The multiple access system may be, for example, the CDMA system, the FDMA system, the TDMA system, the OFDMA system, the SC-FDMA system, or the MC-FDMA systems.

The P2X communication unit may transmit and receive signals to and from the RSU (P2I) and the vehicle 1000 (V2P) in a wireless manner. The P2X communication unit may include an RF circuitry in which communication with infrastructure (P2I), and communication with vehicle (V2P) protocols can be implemented.

The P2X communication unit may perform a function of the V2P communication unit which transmits and receives signals through one of a PC5 interface and an LTE-Uu interface. That is, the P2X communication unit may transmit and receive signals to and from the vehicle 1000 which has established a one-to-one (Direct) connection by means of a Public Key authentication through the PC5 interface. The detailed procedures of the authentication and the connection can be found in the disclosure in section 5.4.5.2 of 3GPP TS 23.303 (Establishment of secure layer-2 link over PC5). In addition, after the public key authentication, the P2X communication unit may transmit and receive signals to and from the vehicle 1000 indirectly connected via an evolved Node B (eNB) through the LTE-Uu interface. The details of the connection procedure can be referred to in the disclosure in the Selected IP Traffic Offload at Local Network (SIPTO@LN) presented in 3GPP TS 23.401.

The ITS communication unit may be connected to the ITS server 5000 that provides road traffic information to transmit and receive signals via one of the Pedestrian to Infrastructure (P2I) protocol and the Pedestrian to Network (P2N) protocol. The ITS communication unit may provide information and data acquired in a traffic system. In addition, the ITS communication unit may receive a control signal from the traffic system to provide the control signal to the terminal control unit 2200.

The terminal control unit 2200 may determine whether the server system 3000 or the mobile communication network has failed by determining a communication state with the server system 3000 based on whether a server signal is received through the terminal communication unit 2100 or on the quality of the received server signal, select at least one communication mode among the plurality of communication modes in response to the determined result, and cause the terminal communication unit 2100 to operate in the selected communication mode. The terminal control unit 2200 may switch from a second communication mode to a first communication mode when there is an issue in transmitting and receiving signals to and from the server system 3000 for more than a few seconds, based on whether the server signal is received through the terminal communication unit 2100 or on the quality of the received server signal. That is, the terminal control unit 2200 may periodically determine whether the server system 3000 or the mobile communication network has failed, and when it is determined that the server system 3000 or the mobile communication network has failed, cause the terminal communication unit 2100 to operate in the first communication mode.

When a signal for selecting the first communication mode is inputted through the terminal user interface unit 2300, the terminal control unit 2200 may control a communication mode of the terminal communication unit 2100 to be switched from the second communication mode to the first communication mode, regardless of whether the server system 3000 or the mobile communication network has failed. Accordingly, a terminal user can use the first communication mode in which direct communication with the vehicle 1000 is supported, instead of the second communication mode supported by a billing mobile communication network (such as LTE and 5G).

The terminal control unit 2200 may determine whether a connection through an external infrastructure of the LTE-Uu interface is impossible while the terminal communication unit 2100 is operating in the first communication mode, based on whether the server signal is received through the terminal communication unit 2100 or on the quality of the received server signal. In this case, when the connection through the external infrastructure is impossible, the terminal control unit 2200 may switch the communication interface of the terminal communication unit 2100 from the LTE-Uu interface to the PC5 interface so that the vehicle sharing service can be continued.

The terminal control unit 2200 may receive, from the ITS server 5000 through the ITS communication unit, attribute information including a position of the RSU 4202 adjacent to the vehicle 1000 and calculate a position where the V2P communication with the vehicle 1000 is possible based on the received attribute information.

When the terminal communication unit 2100 is communicating in the first communication mode, the terminal control unit 2200 may calculate a position where the V2P communication with the vehicle 1000 is possible and cause the calculated position to be displayed through the terminal user interface unit 2300.

When the vehicle 1000 is arranged at the position where the V2P communication is possible, the terminal control unit 2200 may cause the terminal communication unit 2100 to transmit a signal requesting an initiation of the V2P communication to the vehicle 1000. The terminal control unit 2200 may receive in advance, from the terminal communication unit 2100, the terminal user interface unit 2300, or the terminal storage unit 2400, information on the maximum length of the V2P communication supported by the vehicle 1000, and cause, based on the received information, the terminal communication unit 2100 to transmit the signal requesting the initiation of the V2P communication to the vehicle 1000 when a distance between an expected arrival location of the vehicle 1000 and the user terminal 2000 is less than or equal to a distance at which the V2P communication with the user terminal 2000 is possible.

The terminal control unit 2200 may receive a signal requesting an initiation of the V2P communication from the vehicle 1000 through the terminal communication unit 2100 to cause the terminal communication unit 2100 to operate in the first communication mode.

The terminal control unit 2200 may receive position information of the vehicle 1000 through the terminal communication unit 2100, and determine, based on the position information of the user terminal 2000 on which the terminal communication unit 2100 is mounted and the position information of the vehicle 1000, a place and time at which the user is capable of boarding the vehicle 1000, when transmitting and receiving signals to and from the vehicle 1000 in the first communication mode through the terminal communication unit 2100.

The terminal control unit 2200 may be implemented using at least one of ASICs, DSPs, DSPDs, PLDs, FPGAs, Processors, Controllers, Micro-controllers, Microprocessors, and electrical units for performing other functions.

The terminal user interface unit 2300 is for communication between the user terminal 2000 and the terminal user. The terminal user interface unit 2300 may receive a user input signal, transmit the received input signal to the terminal control unit 2200, and provide, to the user, information held by the user terminal 2000 by means of the terminal control unit 2200. The terminal user interface unit 2300 may include, but is not limited to, an input module, an internal camera, a bio-sensing unit, and an output module.

The terminal user interface unit 2300 may output either a video or an audio through the output module.

The terminal storage unit 2400 may be electrically connected to the terminal control unit 2200. The terminal storage unit 2400 may store basic data for each part of the communication mode switching apparatus, control data for controlling operations of each part of the communication mode switching apparatus, and input/output data. The terminal storage unit 2400 may be, in hardware, various storage devices such as a ROM, a RAM, an EPROM, a flash drive, and a hard drive. The terminal storage unit 2400 may store various data for entire operations of the user terminal 2000, such as a program for processing or controlling the terminal control unit 2200. In this case, the terminal storage unit 2400 may be formed integrally with the terminal control unit 2200 or may be implemented as a sub-component of the terminal control unit 2200.

As shown in FIG. 1, the server system 3000 may include a server communication unit and a server control unit.

In this embodiment, the server system 3000 may include components other than those described below, or may not include some of the components described below.

The server communication unit may transmit a server signal to the vehicle communication unit 1100 and the terminal communication unit 2100 and receive signals from the user terminal 1000 and the vehicle 2000.

The server control unit may allocate, to the vehicle sharing service, a vehicle equipped with a vehicle device supporting the vehicle sharing service, when receiving a vehicle allocation request signal from the user terminal 1000, and cause the server communication unit to transmit the server signal when the vehicle equipped with the vehicle device is allocated to the vehicle sharing service.

Figure 6A:
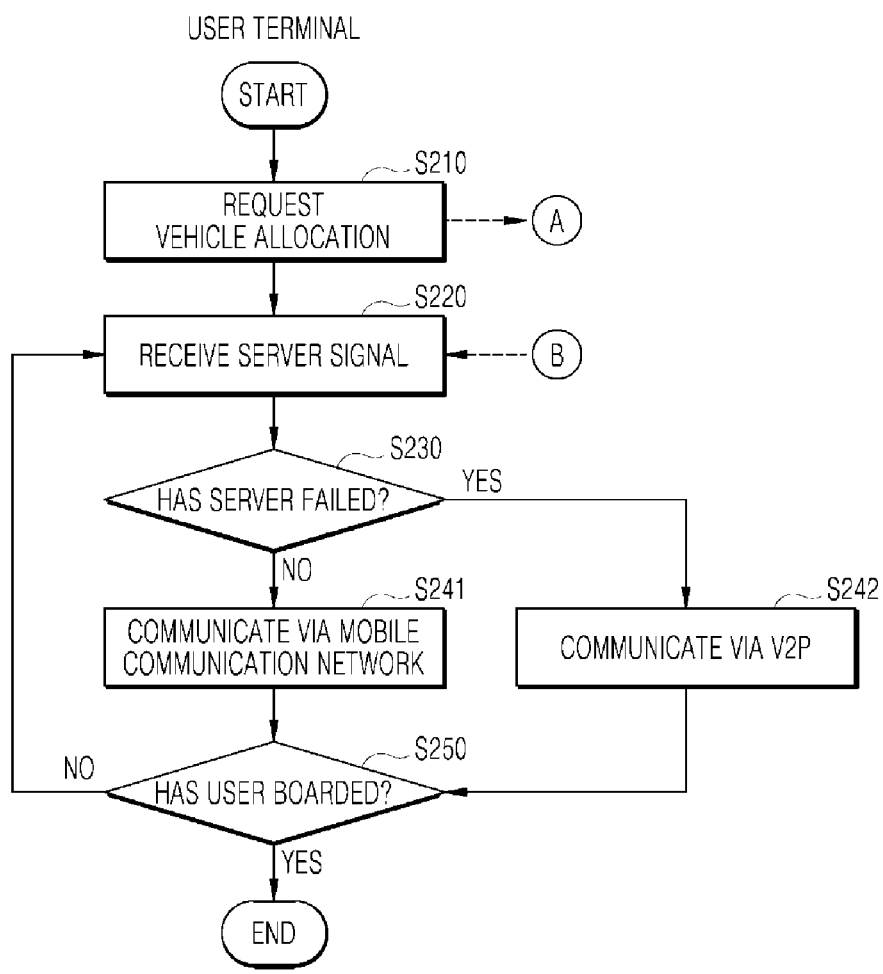
FIGS. 6A to 6C are operational flowcharts illustrating a communication mode switching method according to an embodiment of the present disclosure.
Figure 6B:
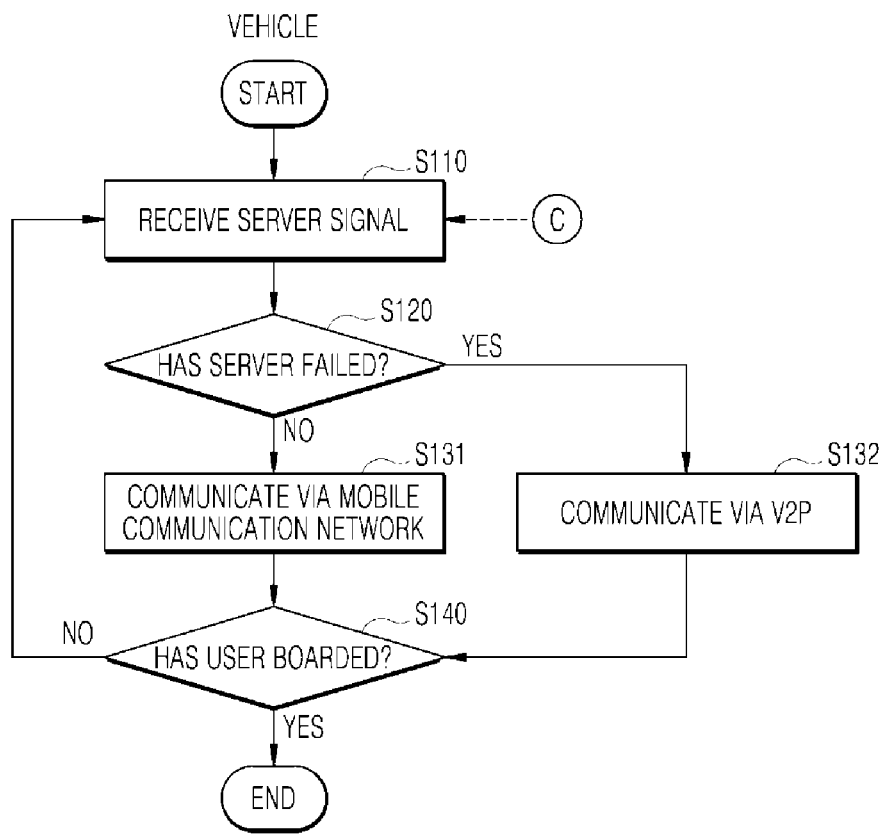
Figure 6C:
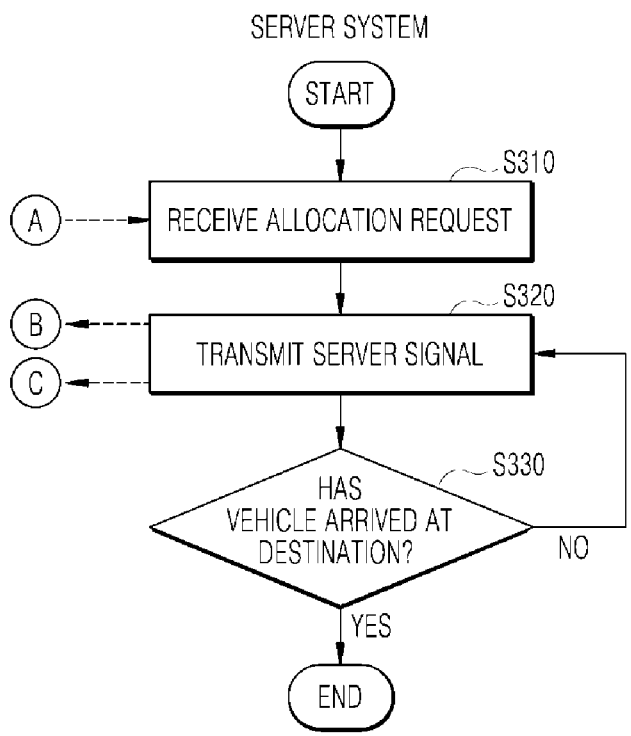

FIGS. 6A to 6C are operational flowcharts illustrating a communication mode switching method according to an embodiment of the present disclosure.

Figure 7:
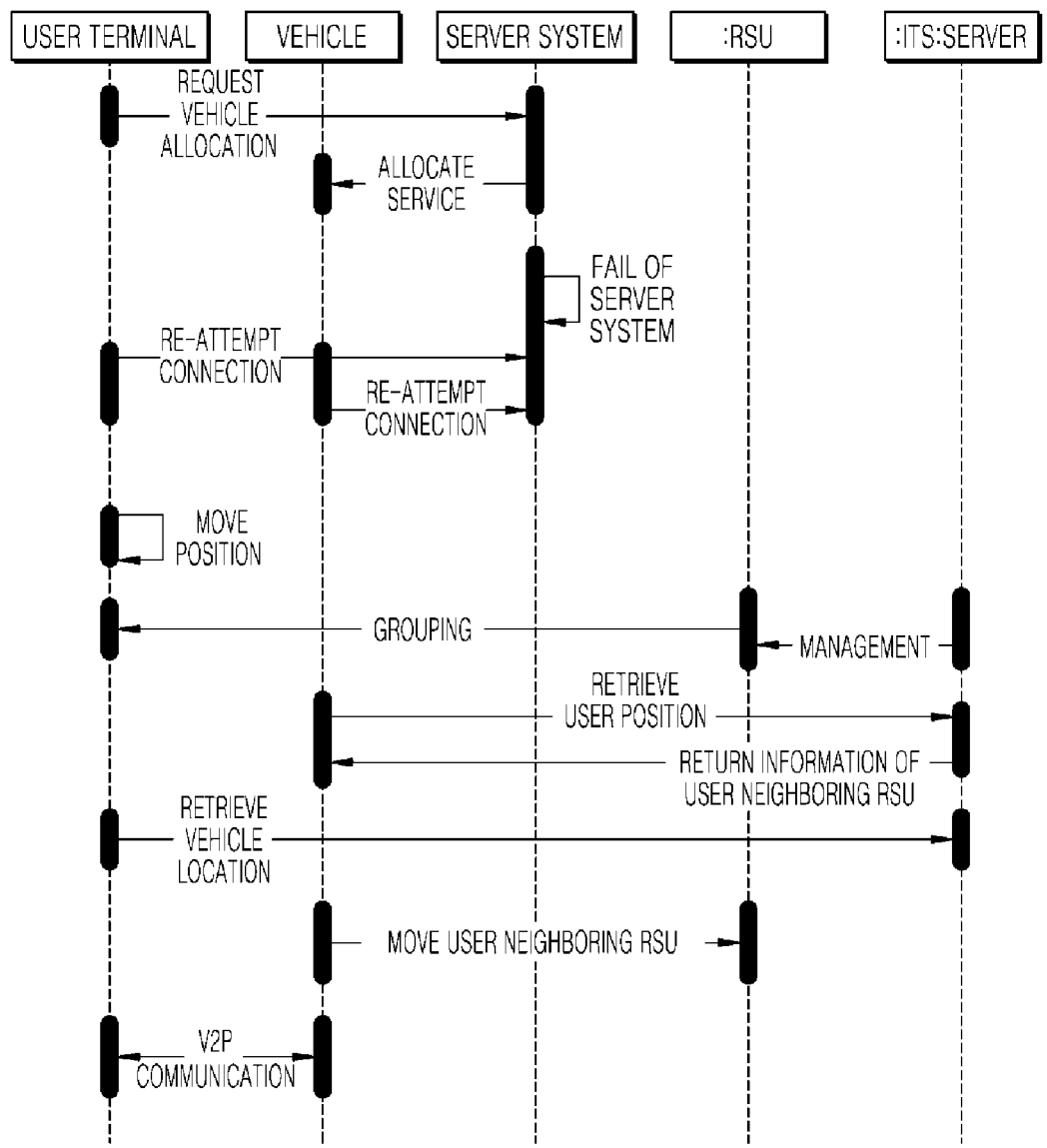
FIG. 7 is a flowchart illustrating an operation of a vehicle sharing service system to which a communication mode switching method according to an embodiment of the present disclosure is applied.

FIG. 7 is a flowchart illustrating an operation of a vehicle sharing service system to which a communication mode switching method according to an embodiment of the present disclosure is applied.

The communication mode switching method may include components other than those shown in FIGS. 6A to 7 and described below, or may not include some of the components shown in FIGS. 6A to 7 and described below.

When the user terminal 2000 requests a vehicle allocation to the server system 3000 (S210, A) (REQUEST VEHICLE ALLOCATION), the server system 3000 may receive the vehicle allocation request signal from the user terminal 2000 (S310, B) and allocate the vehicle 1000 equipped with the communication mode switching apparatus to the vehicle sharing service (ALLOCATE SERVICE).

The server system 3000 may transmit the server signal to the vehicle 1000 and the user terminal 2000 (S320, B, C), as the vehicle 1000 equipped with the communication mode switching device is allocated to the vehicle sharing service. In this case, the server system 3000 may notify that the vehicle 1000 is allocated to the vehicle sharing service, through the server signal transmitted to the vehicle 1000 and the user terminal 2000. The server system 3000 may generate a public key and allocate a private key to the vehicle 1000 and the user terminal 2000, respectively.

The vehicle 1000 may receive a server signal from the server system 3000 (S110, C) and determine whether the server system 3000 or the mobile communication network has failed by determining a communication state based on whether the server signal is received or on the quality of the received server signal (S120). In this case, the vehicle 1000 may determine that the server system 3000 or the mobile communication network has failed when the server signal is not received or an error occurs in receiving the server signal, the server 1000 attempts to connect to the server system 3000. The vehicle 1000 may determine whether the failure is ongoing by periodically attempting to connect to the server system 3000 when the server system 3000 or the mobile communication network has failed (RE-ATTEMPT CONNECTION).

The vehicle 1000 may select at least one of the pluralities of communication modes in response to the determined result (S131, S132). In this case, the plurality of communication modes may include a first communication mode for communicating with the user terminal 2000 via the V2P protocol, and a second communication mode for communicating with the server system 3000 via the mobile communication network.

The vehicle 1000 may select the first communication mode for communicating with the user terminal 2000 via the V2P protocol when the server system 3000 or the mobile communication network has failed (V2P COMMUNICATION) (S132). The vehicle 1000 may attempt a direct connection by means of the PC5 interface after a public key authentication and an indirect connection by means of the LTE-Uu interface after the public key authentication if the direct connection is impossible. The vehicle 1000 may exchange safety messages such as a position or a speed by means of the V2P protocol, with the user terminal 2000. The vehicle 1000 may calculate, using the exchanged message, an optimal boarding location and time of the user carrying the user terminal 2000, and transmit the calculated location and time information to the user terminal 2000. The vehicle 1000 may receive movement information of the user terminal 2000 and update the optimal boarding location and time of the user carrying the user terminal 2000. The vehicle 1000 may store the calculated or updated information on the local disk 6000.

Meanwhile, when there is no failure in the server system 3000 or the mobile communication network, the vehicle 1000 may select a second communication mode for communicating with the server system 3000 via the mobile communication network (S131).

The vehicle 1000 may terminate the communication mode switching operation when the user carrying the user terminal 2000 boards, and repeatedly check whether the server system 3000 or the mobile communication network has failed by a series of steps such as server signal receiving operations until the user has boarded (S140).

The user terminal 2000 may receive a server signal from the server system 3000 (S220) and determine whether the server system 3000 or the mobile communication network has failed by determining a communication state based on whether the server signal is received or on the quality of the received server signal (S230). In this case, the user terminal 2000 may determine that the server system 3000 or the mobile communication network has failed when the server signal is not received or an error occurs in receiving the server signal despite an attempt to connect to the server system 3000. The user terminal 2000 may determine whether the failure is ongoing by periodically attempting to connect to the server system 3000 when the server system 3000 or the mobile communication network has failed (RE-ATTEMPT CONNECTION).

The user terminal 2000 may select at least one of the pluralities of communication modes in response to the determined result (S241, S242). In this case, the plurality of communication modes may include a first communication mode for communicating with the user terminal 2000 via the V2P protocol, and a second communication mode for communicating with the server system 3000 via the mobile communication network.

The user terminal 2000 may select the first communication mode for communicating with the vehicle 1000 via the V2P protocol when the server system 3000 or the mobile communication network has failed (S241) (V2P COMMUNICATION).

Meanwhile, the user terminal 2000 may select the second communication mode for communicating with the server system 3000 via the mobile communication network when the server system 3000 or the mobile communication network has failed (S242).

The user terminal 2000 may terminate the communication mode switching operation when the user boards the vehicle 1000, and repeatedly check whether the server system 3000 or the mobile communication network has failed by a series of steps such as server signal receiving operations until the user has boarded (S250).

The server system 3000 may terminate the service as the vehicle 1000 arrives at the destination and continuously transmit, to the vehicle 1000 or the user terminal 2000, the server signal necessary for the vehicle sharing service until the vehicle 1000 arrives at the destination (S330).

When the user terminal 2000 moves (MOVE POSITION), the vehicle 1000 may retrieve, from the ITS server 5000 through the adjacent RSU 4201, information associated with the RSU 4202 to which the user terminal 2000 belongs as a child node (RETRIEVE USER POSITION).

The ITS server 5000 may manage the plurality of RSUs 4201 and 4202 (MANAGEMENT), and may distribute and manage data by providing a server for each region (GROUPING). Each local server may hold the plurality of RSUs.

The ITS server 5000 may provide the vehicle 1000 with information on the RSU 4202 adjacent to the user terminal 2000 identified through the management of the plurality of RSUs 4201 and 4202 (RETURN INFORMATION OF USER NEIGHBORING RSU).

Meanwhile, the user terminal 2000 may retrieve, from the ITS server 5000 through the neighboring RSU 4201, information associated with the RSU 4201 to which the vehicle 1000 belongs as a child node (RETRIEVE VEHICLE POSITION).

The vehicle 1000 may move to the vicinity of the RSU 4202 to which the user terminal 2000 belongs as the child node based on the information provided from the ITS server 5000 (MOVE TO USER NEIGHBORING RSU) and may perform the initiation of the V2P communication (V2P COMMUNICATION).

With reference to FIGS. 1 to 7, the operation of the communication mode switching apparatus and method according to the embodiment of the present disclosure will be described as follows.

Referring to FIG. 1, the vehicle control unit 1200 may cause the vehicle 1000 to bypass another vehicle by means of the running unit 1700 when receiving a safety message from the another vehicle, for example, a vehicle for which an accident has occurred while driving ahead, through the V2X communication unit 1120 of the vehicle communication unit 1100.

In this case, the vehicle control unit 1200 may transmit information that the vehicle 1000 has bypassed the another vehicle to the server system 3000 through the wireless communication unit 1110. The server system 3000 may notify the user terminal 2000 of the information that the vehicle 1000 has bypassed the another vehicle by means of the server signal.

As the distance between the vehicle 1000 having entered the bypass route and the user terminal 2000 approaches within a range in which communication is possible via the V2P protocol, the vehicle control unit 1200 may cause the user terminal 2000 to transmit a signal requesting an initiation of the V2P communication through the vehicle communication unit 1100.

The terminal control unit 2200 may cause the terminal communication unit 2100 to operate in the first communication mode conforming to the V2P protocol when receiving the signal requesting the initiation of the V2P communication generated by the vehicle control unit 1200, through the terminal communication unit 2100.

The vehicle control unit 1200 may receive information from at least one of the navigation unit 1800, the position information unit, and the running unit 1700, and transmit, based on the received information, boarding information such as a detailed position of the vehicle 1000 and an expected time to the destination, to the server system 3000 or the terminal communication unit 2100 through the vehicle communication unit 1100.

The vehicle control unit 1200 can secure the communication efficiency by binarizing the information to be transmitted through the server system 3000 and the information to be directly transmitted to the user terminal 2000 such that the vehicle control unit 1200 can share roles with the server system 3000. That is, the vehicle control unit 1200 may provide the position information to the user terminal 2000 via a communication mode according to the V2P protocol, and may provide the information other than the position information to the user terminal 2000 through the server system 3000 via the communication mode using the mobile communication network 2000, thereby solving the issue caused by a communication blind spot with the server system 3000.

The packet loss of a signal exchanged in the communication mode via the V2P protocol between the vehicle 1000 and the user terminal 2000 can be handled in the server system 3000. To this end, the packets exchanged via the V2P protocol between the vehicle 1000 and the user terminal 2000 may be temporarily stored and then transmitted to the server system 3000 through the wireless communication unit 1110 of the vehicle communication unit 1100. In this case, the packets may be stored in the vehicle storage unit 1900 under the control of the vehicle control unit 1200 and may be stored in any local disk 6000, for example, a Telematics Control Unit (TCU).

The vehicle control unit 1200 may terminate the communication of the V2P protocol between the vehicle 1000 and the user terminal 2000 when determining that the user carrying the user terminal 2000 has boarded, through the vehicle user interface unit 1300 or the driving operation unit 1500.

The server system 3000 may transmit, to the user terminal 2000, information including a boarding location of the vehicle 1000 allocated at the time of initial reservation of the vehicle by the user terminal 2000 and the time at which the vehicle 1000 arrives at the boarding location. The server system 3000 may store the information transmitted to the user terminal 2000 on the local disk 6000.

Meanwhile, the terminal control unit 2200 may transmit information on a surrounding situation of the user to the RSU 4202 adjacent to the user terminal 2000 through the terminal communication unit 2100 when the vehicle 1000 is allocated to the server system 3000. The V2N server 4100 may transmit information on a surrounding situation of the user terminal 2000 received through the RSU 4202 to the vehicle communication unit 1100 through the RSU 4201 adjacent to the vehicle 1000.

The vehicle control unit 1200 may generate route information to avoid objects, for example, a drone, that may interfere with communication according to the V2P protocol, based on information about the surrounding situation of the user terminal 2000 received through the vehicle communication unit 1100. The vehicle control unit 1200 may induce the movement of the position of the user carrying the user terminal 2000 by transmitting the generated route information to the user terminal 2000. In this case, the vehicle control unit 1200 may generate the route information for bypassing an event occurrence zone that may interfere with the movement of the user carrying the user terminal 2000, for example, a road control zone caused by any construction, based on the information on the surrounding situation of the user terminal 2000 received through the vehicle communication unit 1100, and may transmit the generated route information to the user terminal 2000.

The user terminal 2000 may transmit the movement position information to the vehicle 1000 through the terminal communication unit 2100. The vehicle control unit 1200 may update the boarding information on the boarding time and the boarding position based on the movement position information of the received user terminal 2000 and may transmit the updated information to the server system 3000 through the vehicle communication unit 1100.

The vehicle control unit 1200 may re-update the boarding information on the boarding time and the boarding position as a distance between the vehicle 1000 and the user terminal 2000 approaches within a range in which communication is possible via the V2P protocol, and may transmit the updated information to the user terminal 1000 or the server system 3000 through the vehicle communication unit 1100.

The user terminal 1000 may receive the updated boarding information from the vehicle 1000 or the server system 3000. The user carrying the user terminal 1000 can recognize the updated boarding information through the terminal user interface unit 2300 and can board the vehicle 1000 at the correct position and time based on the recognized information.

Referring to FIG. 4, a V2P protocol communication connection operation in which the vehicle 1000 or the user terminal 2000 and the ITS server 5000 communicate with each other while the server system 3000 has failed will be described below.

The ITS server 5000 may manage the plurality of RSUs 4201 and 4202. The plurality of RSUs 4201 and 4202 may communicate with the ITS server 5000 using the I2N protocol. The ITS server 5000 may distribute and manage data with a server for each region. Each local server may hold a plurality of RSUs.

The vehicle 1000 or the user terminal 2000 may be a child node of each RSU 4201 and 4202. The vehicle 1000 may communicate with the RSUs 4201 and 4202 using the V2I protocol and the user terminal 2000 may communicate with the RSUs 4201 and 4202 using the P2I protocol. Each node, that is, the vehicle 1000 or the user terminal 2000, has a Receive Signal Strength Indicator (RSSI) value with the RSUs 4201 and 4202, and the vehicle 1000 or the user terminal 2000 may be connected as a child node of an RSU having a large RSSI value.

The vehicle 1000 may query the ITS server 5000 through the neighboring RSU 4201 for information about the RSU 4202 to which the user terminal 2000 belongs as a child node.

The vehicle 1000 may be moved to the vicinity of the RSU 4202 to which the user terminal 2000 belongs as a child node and attempt the V2P protocol communication with the user terminal 2000, based on the queried information.

Referring to FIG. 5, a disembarking operation in which the vehicle 1000 and the billing server 7000 communicate with each other while the server system 3000 has failed will be described below.

The server system 3000 may store the destination information on the local disk 6000. In this case, the destination information may be stored in the terminal storage unit 2400 or the vehicle storage unit 1900.

The vehicle control unit 1200 may check whether the server system 3000 has failed when it is determined that the vehicle has arrived at the disembarking point, based on the information provided by the vehicle user interface unit 1300, the running unit 1700, the navigation unit 1800, and the vehicle storage unit 1900.

The vehicle control unit 1200 may communicate directly with the billing server 7000 through the vehicle communication unit 1100 when there is an issue in transmitting and receiving signals to and from the server system 3000 for more than a few seconds, based on whether the server signal is received through the vehicle communication unit 1100 or on the quality of the received server signal.

The terminal control unit 2200 may directly communicate with the billing server 7000 through the vehicle communication unit 1100 when there is an issue in transmitting and receiving signals to and from the server system 3000 for more than a few seconds, based on whether the server signal is received through the terminal communication unit 2100 or on the quality of the received server signal.

When the vehicle 1000 or the user terminal 2000 communicates directly with the billing server 7000, the transmission/reception information history may be stored in the local disk 6000, the terminal storage 2400, or the vehicle storage 1900.

When the fault situation of the server system 3000 is terminated after the user disembarks from the vehicle, the information stored in the local disk 6000, the terminal storage unit 2400, or the vehicle storage unit 1900 may be provided to the server system 3000.

The above-described present disclosure can be implemented as computer-readable code on a medium on which a program is recorded. The computer readable medium includes all types of recording devices in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, and an optical data storage device, and may also be implemented in the form of a carrier wave (for example, transmission over the Internet). In addition, the computer may also include a processor or control unit. Accordingly, the present disclosure described as above is not limited by the aspects described herein and accompanying drawings. It should be apparent to those skilled in the art that various substitutions, changes, and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

According to this embodiment of the present disclosure, when the user uses a vehicle sharing service, the reliability of the vehicle sharing service can be improved by continuously supporting communication between an allocated vehicle and a user, even when a server of the vehicle sharing service has malfunctioned or a mobile communication network has failed.

In addition, according to this embodiment of the present disclosure, a direct communication connection can be ensured under various circumstances by providing a position where the direct communication connection between the vehicle and the user is possible even when a server system for providing the vehicle sharing service or a mobile communication network has failed.

In addition, according to this embodiment of the present disclosure, the communication speed degradation caused by the server system that provides the vehicle sharing service may be overcome by direct communication between the allocated vehicle and the user, such that the vehicle side can quickly grasp the changes between the users and the user side can quickly receive information for sharing vehicles.

In addition, according to this embodiment of the present disclosure, the history information necessary for billing may be stored in the local disk even when the communication state between the allocation vehicle or the user terminal and the server system providing the vehicle sharing service has failed, and the history information stored in the local disk may be transmitted to the server system after the communication resumes, thereby performing the billing process irrespective of whether the communication has failed.

The effects of the present disclosure are not limited to those mentioned above, and other effects not mentioned can be clearly understood from the following description.

While one or more exemplary embodiments of the present disclosure have been described with reference to the figures, it will be understood by those of ordinary skill in the art that various changes in form and details may be made therein without departing from the spirit and scope of the inventive concept as defined by the following claims.

What is claimed is:

1. An in-vehicle communication mode switching apparatus configured to transmit and receive signals when connected to a user terminal and a server system providing a vehicle sharing service, the apparatus comprising:
   a communication unit configured to support a plurality of communication modes and communicate with the server system, the plurality of communication modes including a first communication mode for communicating with the user terminal via a Vehicle to Pedestrian (V2P) protocol and a second communication mode for communicating with the server system via a mobile communication network; and
   a control unit configured to:
     control the communication unit to communicate with the server system,
     determine, according to a communication state between the communication unit and the server system, whether the server system or the mobile communication network has failed,
     select at least one communication mode among the plurality of communication modes in response to the determined result,
     cause the communication unit to operate in the selected communication mode, and
     calculate, when the first communication mode is selected, a position where the V2P communication with the user terminal is possible.

2. The communication mode switching apparatus according to claim 1, wherein the control unit is configured to:
   periodically determine whether the server system or the mobile communication network has failed;
   when it is determined that the server system or the mobile communication network has failed, cause the vehicle to move to the position where the V2P communication with the user terminal is possible and cause the communication unit to operate in the first communication mode; and
   cause the communication unit to operate in the first communication mode or the second communication mode when the server system or the mobile communication network has not failed.

3. The communication mode switching apparatus according to claim 1, wherein the communication unit includes a wireless communication unit configured to support the second communication mode and transmit and receive signals via the mobile communication network; and
   a V2P communication unit configured to support the first communication mode and transmit and receive signals through one of a PC5 interface and an LTE-Uu interface.

4. The communication mode switching apparatus according to claim 3, wherein the communication unit further includes an ITS communication unit connected to an Intelligent Transport System (ITS) server configured to provide road traffic information, so that signals are transmitted and received via one of a Vehicle to Infrastructure (V2I) protocol and a Vehicle to Network (V2N) protocol, and
   the control unit receives, from the ITS server through the ITS communication unit, attribute information including a position of a RoadSide Unit (RSU) adjacent to the user terminal, and calculates, based on the received attribute information, a position where the V2P communication with the user terminal is possible.

5. The communication mode switching apparatus according to claim 4, wherein the control unit causes the user terminal to transmit a signal requesting an initiation of the V2P communication through the communication unit when the user terminal is arranged at the position where the V2P communication is possible.

6. The communication mode switching apparatus according to claim 1, wherein the control unit receives position information of the user terminal through the communication unit and determines, based on position information of the vehicle on which the communication unit is mounted and the position information of the user terminal, a location and time at which a user carrying the user terminal is capable of boarding, when transmitting and receiving signals to and from the user terminal in the first communication mode through the communication unit.

7. The communication mode switching apparatus according to claim 1, wherein the communication unit communicates with a local disk of a telematics control unit connected to the server system, and
the control unit generates billing information based on position information of a vehicle device on which the communication unit is mounted, and transmits the generated billing information to the local disk, when transmitting and receiving signals to and from the user terminal in the first communication mode through the communication unit.

8. A communication mode switching apparatus connected to a vehicle device and a server system providing a vehicle sharing service, so that signals are transmitted and received, the apparatus comprising:
a user interface unit configured to output one of video and audio;
a communication unit configured to support communication by means of a plurality of communication modes and communicate with the server system; and
a control unit configured to:
control the communication unit to communicate with the server system,
determine, according to a communication state of the communication unit with the server system, whether the server system or a mobile communication network has failed,
select at least one communication mode among a plurality of communication modes in response to the determined result, wherein the plurality of communication modes includes a first communication mode for communicating with the vehicle device via a Vehicle to Pedestrian (V2P) protocol, and a second communication mode for communicating with the server system via the mobile communication network,
cause the communication unit to operate in the selected communication mode, and
calculate, when the first communication mode is selected, a position where the V2P communication with the vehicle device is possible, and cause the calculated position to be displayed through the user interface unit.

9. The communication mode switching apparatus according to claim 8, wherein the communication unit includes a wireless communication unit configured to support the second communication mode and to transmit and receive signals via the mobile communication network; and
a V2P communication unit configured to support the first communication mode and to transmit and receive signals through any one of a PC5 interface and an LTE-Uu interface.

10. The communication mode switching apparatus according to claim 9, wherein the communication unit further includes an ITS communication unit connected to an Intelligent Transport System (ITS) server configured to provide road traffic information, so that signals are transmitted and received via a Pedestrian to Network (P2N) protocol, and a P2I communication unit connected to an RoadSide Unit (RSU) connected to the ITS server 5000, so that signals are transmitted and received via a Pedestrian to Infrastructure (P2I), and
the control unit receives attribute information including a position of the RoadSide Unit (RSU) adjacent to the vehicle device from the ITS server through the ITS communication unit, and calculates a position where the V2P communication with the vehicle device is possible based on the received attribute information.

11. The communication mode switching apparatus according to claim 8, wherein the control unit causes the communication unit to operate in the first communication mode when receiving, from the vehicle device through the communication unit, a signal requesting initiation of the V2P communication.

12. The communication mode switching apparatus according to claim 8, wherein the communication unit communicates with a local disk of a telematics control unit connected to the server system, and
the control unit generates billing information based on position information of a user terminal on which the communication unit is mounted, and transmits the generated billing information to the local disk, when transmitting and receiving signals to and from the vehicle device in the first communication mode through the communication unit.

13. A method for switching a communication mode of a vehicle device communicating with a server system in a vehicle sharing service, the method comprising:
communicating with the server system;
determining, according to a communication state with the server system, whether the server system or a mobile communication network has failed, and selecting, in response to the determined result, at least one communication mode among a plurality of communication modes including a first communication mode for communicating with a user terminal via a Vehicle to Pedestrian (V2P) protocol and a second communication mode for communicating with the server system via the mobile communication network;
calculating, when the first communication mode is selected, a position where the V2P communication with the user terminal is possible; and
causing the vehicle to be moved to the position where the V2P communication with the user terminal is possible.

14. A method for switching a communication mode of a user terminal communicating with a server system and a vehicle device in a vehicle sharing service, the method comprising:
communicating with the server system;
determining, according to a communication state with the server system, whether the server system or a mobile communication network has failed, and selecting, in response to the determined result, at least one communication mode among a plurality of communication modes including a first communication mode for communicating with the vehicle device via a Vehicle to Pedestrian (V2P) protocol and a second communication mode for communicating with the server system via the mobile communication network;

calculating, when the first communication mode is selected, a position where the V2P communication with the user terminal is possible; and causing the position where the V2P communication with the vehicle device is possible to be displayed.

15. A non-transitory computer-readable recording medium on which a program for switching a communication mode of a vehicle device communicating with a server system in a vehicle sharing service is recorded, the program causing a computer to perform:

communicating with the server system;

determining, according to a communication state with the server system, whether the server system or a mobile communication network has failed, and selecting, in response to the determined result, at least one communication mode among a plurality of communication modes including a first communication mode for communicating with a user terminal via a Vehicle to Pedestrian (V2P) protocol and a second communication mode for communicating with the server system via the mobile communication network;

calculating, when the first communication mode is selected, a position where the V2P communication with the user terminal is possible; and causing the vehicle to be moved to the position where the V2P communication with the user terminal is possible.

16. A non-transitory computer-readable recording medium on which a program for switching a communication mode of a user terminal communicating with a server system and a vehicle device in a vehicle sharing service is recorded, the program causing a computer to perform:

communicating with the server system;

determining, according to a communication state with the server system, whether the server system or a mobile communication network has failed, and selecting, in response to the determined result, at least one communication mode among a plurality of communication modes including a first communication mode for communicating with the vehicle device via a Vehicle to Pedestrian (V2P) protocol and a second communication mode for communicating with the server system via the mobile communication network;

calculating, when the first communication mode is selected, a position where the V2P communication with the user terminal is possible; and causing the position where the V2P communication with the vehicle device is possible to be displayed.

\* \* \* \* \*